United States Patent
Shveidel et al.

(10) Patent No.: US 12,517,886 B2
(45) Date of Patent: Jan. 6, 2026

(54) DESTAGING METADATA CHANGES USING READ LOCKS

(71) Applicant: Dell Products L.P., Round Rock, TX (US)

(72) Inventors: Vladimir Shveidel, Pardes Hana-Karkur (IL); Dror Zalstein, Givatayim (IL); Nimrod Shani, Raanana (IL); Jenny Derzhavetz, Raanana (IL); Michael Litvak, Shoham (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/414,632

(22) Filed: Jan. 17, 2024

(65) Prior Publication Data

US 2025/0231926 A1 Jul. 17, 2025

(51) Int. Cl.
*G06F 16/00* (2019.01)
*G06F 11/10* (2006.01)
*G06F 16/23* (2019.01)

(52) U.S. Cl.
CPC ...... *G06F 16/2343* (2019.01); *G06F 11/1004* (2013.01); *G06F 16/2358* (2019.01)

(58) Field of Classification Search
CPC ............. G06F 16/2343; G06F 16/2358; G06F 16/2365
USPC .......................................................... 707/704
See application file for complete search history.

(56) References Cited

U.S. PATENT DOCUMENTS

| | | | |
|---|---|---|---|
| 11,042,296 B1* | 6/2021 | Shveidel | G06F 3/0659 |
| 2021/0216531 A1* | 7/2021 | Shveidel | G06F 16/2365 |
| 2022/0342825 A1* | 10/2022 | Derzhavetz | G06F 9/30047 |

OTHER PUBLICATIONS

Derzhavetz, Jenny, et al.; "System and Method for Lockless Reading of Metadata Pages"; U.S. Appl. No. 17/237,398, filed Apr. 22, 2021.
Shveidel, Vladimir, et al.; "System and Method for Aggregating Metadata Changes in Storage System"; U.S. Appl. No. 16/260,660, filed Jan. 29, 2019.
Derzhavetz, Jenny, et al.; "Processing Metadata Changes Using Multiple Aggregation Policies," U.S. Appl. No. 18/494,196, filed Oct. 25, 2023.

* cited by examiner

*Primary Examiner* — Chelcie L Daye
(74) *Attorney, Agent, or Firm* — BainwoodHuang

(57) ABSTRACT

A technique of managing metadata includes receiving metadata changes into active tablets. When the active tablets are filled, the active tablets are changed to frozen tablets, whereupon previously frozen tablets are freed and changed to the active tablets. The technique further includes destaging metadata changes from the frozen tablets to pages in backend storage under read locks. Tablet generation identifiers (TGIDs) are assigned to successive generations of tablets, and a TGID of the frozen tablets is stored with the pages that are written as part of destaging from the frozen tablets.

20 Claims, 4 Drawing Sheets

- If Read first, TGID read = 8; Update with changes with TGID>8
- If Write first, TGID read = 9; Update with changes with TGID>9
- Retry Read upon checksum failure

- When find DD for LI=3 during later destaging, ignore D3 and D4 but apply D5 and D6

DESTAGING METADATA CHANGES USING READ LOCKS

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Storage systems typically use metadata for organizing and managing user data. To this end, a storage system may operate two sets of in-memory tablets, an active set and a frozen set. As new actions that affect metadata arise, the storage system creates metadata changes and writes the changes to the active set. When the active set becomes full, the storage system freezes the active set, changing it to the new frozen set, and clears the frozen set, changing it to the new active set. To persist the metadata changes, the storage system destages the changes from both sets of tablets (active and frozen) by writing the changes to pages in backend storage. Once destaging is complete and after the new active set becomes full, the tablets switch again and the process repeats.

To ensure data consistency, pages to be written when destaging are held under write locks. The write locks prevent other clients from accessing the locked pages while the pages are being modified. They also prevent any new metadata changes affecting the locked pages from entering the active tablets, ensuring that the storage system accounts for all changes in both sets of tablets when destaging.

SUMMARY

Unfortunately, the above-described approach has deficiencies. When the pages to be written are being held under write locks, no other access to the locked pages is permitted, not even reads. Thus, responses to read requests are delayed behind the write locks and can be subject to long and variable latency, reducing system performance. The above-described approach is also complex. Not only does it require careful management of contention, but it also requires a complex scheme for ensuring that metadata changes are written only once. Some metadata changes, such as INCREFs, are not idempotent, and corruption can occur if the changes are written multiple times. The prior scheme manages this risk by placing markers in active tablets that indicate when associated pages are committed for writing. Such markers provide barriers that the storage system can use, e.g., during a subsequent destaging cycle, to identify which metadata changes should be written and which should be ignored. But the arrangement is complex and consumes considerable processing resources. What is needed, therefore, is a more efficient way of writing metadata changes that reduces contention and complexity.

The above need is addressed at least in part by an improved technique of managing metadata. The technique includes receiving metadata changes into active tablets. When the active tablets are filled, the active tablets are changed to frozen tablets, whereupon previously frozen tablets are freed and changed to the active tablets. The technique further includes destaging metadata changes from the frozen tablets to pages in backend storage under read locks. Tablet generation identifiers (TGIDs) are assigned to successive generations of tablets, and a TGID of the frozen tablets is stored with the pages that are written as part of destaging from those frozen tablets.

Advantageously, the improved technique avoids delays and contention by replacing write locks with read locks, which allow less contested reading and writing. Also, in some examples the improved technique avoids the use of markers in tablets to prevent duplicate writes, as the same results can be achieved instead by limiting writes to changes found in tablet sets having TGIDs greater than those associated with the pages being written. The new arrangement thus allows for much less complex and resource intensive processing than was possible using the previous approach.

Certain embodiments are directed to a method of managing metadata. The method includes providing an active set of tablets that receives and stores metadata changes and a frozen set of tablets that stores a plurality of metadata changes that were previously received but does not currently receive metadata changes. The active set of tablets and the frozen set of tablets each have a respective tablet generation identifier (TGID). The method further includes destaging the plurality of metadata changes from the frozen set of tablets to a plurality of pages in backend storage, said destaging including, for each of the plurality of pages, performing a write operation on the page under a read lock and storing the TGID of the frozen set of tablets in association with the written page. After destaging, the method still further includes (i) switching the active set of tablets and the frozen set of tablets such that the active set of tablets becomes frozen and the frozen set of tablets becomes active and (ii) assigning a new TGID to the newly active set of tablets.

Other embodiments are directed to a computerized apparatus constructed and arranged to perform a method of managing metadata, such as the method described above. Still other embodiments are directed to a computer program product. The computer program product stores instructions which, when executed on control circuitry of a computerized apparatus, cause the computerized apparatus to perform a method of managing metadata, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique of managing metadata includes receiving metadata changes into active tablets. When the active tablets are filled, the active tablets are changed to frozen tablets, whereupon previously frozen tablets are freed and changed to active tablets. The technique further includes destaging metadata changes from the frozen tablets to pages in backend storage under read locks. Tablet generation identifiers (TGIDs) are assigned to successive generations of tablets, and a TGID of the frozen tablets is stored with the pages that are written as part of destaging from the frozen tablets.

Figure 1:
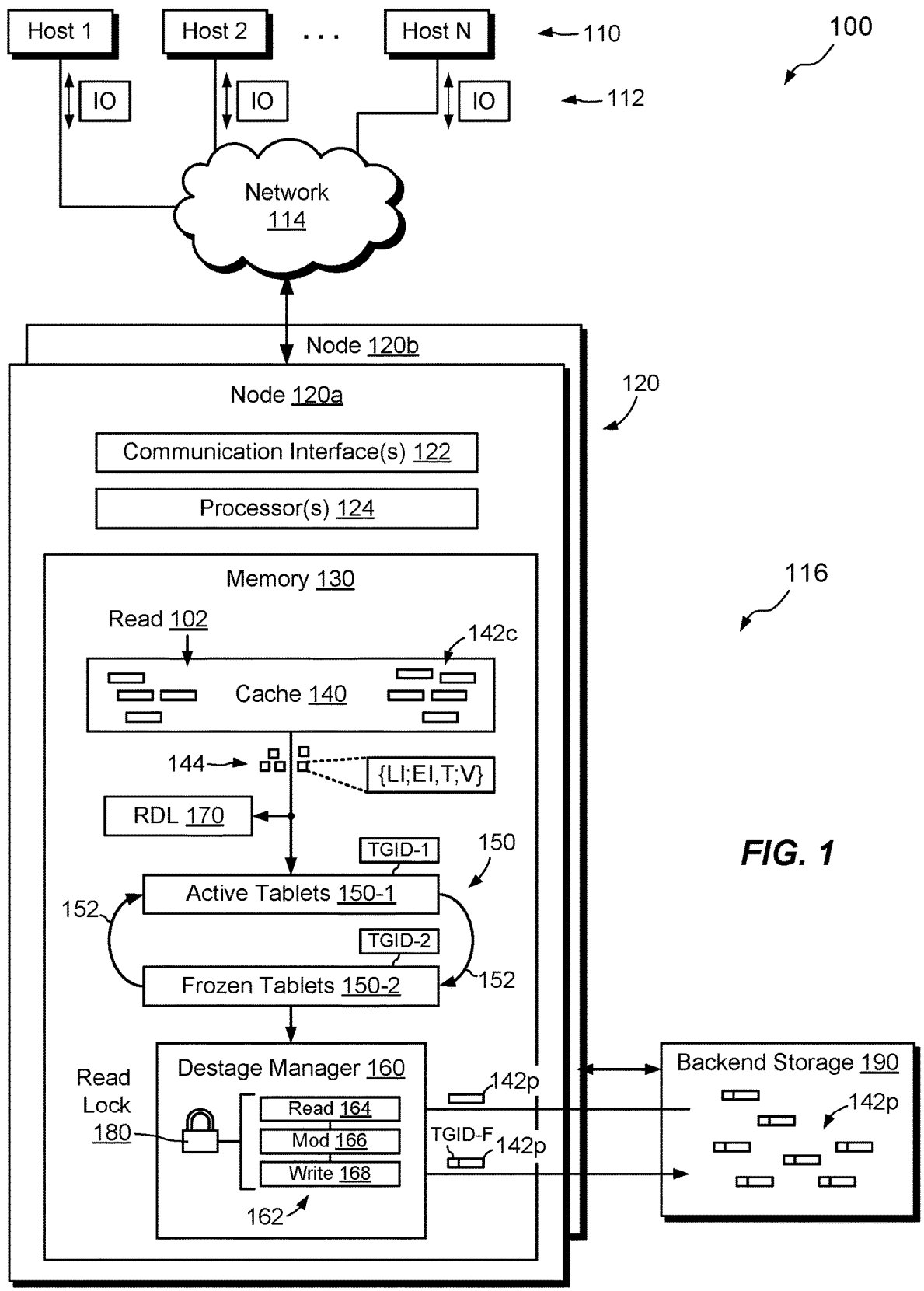
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and backend storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared backend storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the node 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the backend storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by the node 120a. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140, two sets of tablets 150, a destage manager 160, and a raw data log (RDL) 170. The cache 140 is configured to store data in the form of cached pages 142c. Persistent versions 142p of the cached pages 142c may be found in the backend storage 190. The cache 140 may read persistent pages 142p from backend storage 190, such that the pages are available for responding quickly to host reads of I/O requests 112. Also, the cached pages 142c can be modified quickly without having to obtain them from the backend storage 190 every time a change is needed. In an example, each page 142c (or 142p) corresponds one-to-one to a respective "block" of storage, i.e., the smallest unit of storage space that the data storage system 116 can allocate. Such one-to-one correspondence is not required, however. Typical page sizes are 4 KB (kilo-Bytes), 8 kB, or the like, although no particular page size is required.

The sets of tablets 150 include one set of tablets 150-1 designated as "active" and another set of tablets 150-2 designated as "frozen." Each set of tablets includes one or more individual tablets. The term "tablet" as used herein refers to a data structure, such as a tree, array, or the like. In an example, the sets of tablets 150 are in-memory structures, stored temporarily in volatile memory (e.g., RAM). Alternatively or additionally, one or both sets of tablets may be persisted.

The active set of tablets 150-1 is configured to receive metadata changes 144 from cache 140 and to arrange those metadata changes 144 based on page identifier, referred to herein as "LI" (logical index). In an example, each page in the storage system 116 has a unique LI. Placing metadata changes 144 into active tablets based on LI is facilitated by the expression of metadata changes 144 in a compact format, such as a 4-part tuple that includes LI, as well as "EI" (an entry index within the page), "T" (the type of metadata being changed), and "V" (a value, such as a new value of the metadata element defined by the LI and EI). Working with metadata changes 144 in the compact format enables multiple changes to be arranged in the tablets per LI (page) and aggregated before writing to the backend 190, thus reducing write amplification and time-consuming disk accesses. The set of frozen tablets 150-2 is a frozen-in-time version of a previous set of active tablets 150-1.

In accordance with improvements hereof, each set of tablets 150 has a respective tablet generation identifier (TGID), such as TGID-1 for active tablets 150-1 and TGID-2 for frozen tablets 150-2. As will be described, TGIDs are unique identifiers of tablet generations, and a new TGID is assigned whenever a new active set of tablets 150-1 is provided.

Destage manager 160 is configured to destage metadata changes 144 to backend storage 190. For example, the destage manager 160 is arranged to access metadata changes 144 from the set of frozen tablets 150-2, to aggregate changes per LI (page), and to update pages 142$p$ in the backend to include the aggregated changes.

Raw data log (RDL) 170 is a persistent log provided for recovery purposes. For example, whenever metadata changes 144 are written to the active tablets 150-1, the same changes are also written to the RDL 170. In the event of a system crash or reboot, metadata changes 144 can be replayed from the RDL 170 with no loss of information.

In example operation, hosts 110 issue I/O requests 112 to the data storage system 116. Node 120 receives the I/O requests 112 at the communication interfaces 122 and initiates further processing. Such processing may include defining metadata changes 144 needed to accommodate new data or changes in existing data. Examples of such metadata changes include updating mapping pointers (e.g., those used to locate physical data based on logical addresses), changes in reference counts (e.g., to increment or decrement reference counts), clearing of certain metadata structures, allocating others, and the like. Some metadata changes 144 may arise not from host I/Os 112 but from internal operations, such as deduplication, compression, migration, and/or the like.

Processing of the cache 140 may include creating metadata changes 144 within the context of "transactions," i.e., sets of metadata changes 144 to be performed together atomically. Once the metadata changes 144 for a transaction are created, the cache 140 writes the metadata changes 144 for the transaction to both the RDL 170 and to the active set of tablets 150-1, e.g., in locations designated for the LIs of the pages being changed. Large numbers of transactions may be processed this way.

Eventually, the set of active tablets 150-1 becomes full. For example, the tablets have defined sizes and may be reaching their maximum limits as metadata changes 144 continue to accrue. When this occurs, the storage node 120 may initiate a tablet switch 152. Upon the tablet switch 152, the currently-active set of tablets is frozen, becoming the new frozen set of tablets. At the same time, the currently-frozen set of tablets is cleared (e.g., its data are zeroed out), becoming the new active set of tablets. The newly-active set of tablets then receives new metadata changes 144 from cache 140, and the newly-frozen set of tablets becomes available for destaging.

During the tablet switch 152, a new TGID is assigned to the newly-active set of tablets. For example, TGIDs may be assigned as monotonically changing numbers, such that the TGID assigned to the newly-active set of tablets is greater (or less) than the highest (or lowest) TGID that was previously assigned. For simplicity, it is assumed for the remainder of this description that TGIDs are assigned as monotonically increasing numbers, which increment by one each time a new active set of tablets is provided.

Destaging proceeds by iterating over all pages 142$p$ for which metadata changes 144 are specified in the currently frozen set of tablets. For each such page 142$p$, the destage manager 160 performs a read-modify-write operation 162, which includes reading 164 the page 142$p$ from backend storage 190, modifying 166 the page 142$p$ to include all of the metadata changes 144 specified for that page in the frozen set of tablets, and then writing 168 the page 142$p$ back to persistent storage 190. When writing 168 the modified page 142$p$, the destage manager 160 also writes the TGID of the currently frozen set of tablets, i.e., TGID-F. For example, TGID-F may be written to a header or footer of the page 142$p$, or to some other storage location associated with the page 142$p$.

Significantly, and in contrast with prior approaches, metadata changes 144 written when destaging may be limited to those found in the set of frozen tablets 150-2. Changes in the set of active tablets 150-1 are deferred until the next destaging cycle, when the active tablets become frozen. A consequence of this approach is that pages 142$p$ in backend storage 190 are not completely up to date with all changes after destaging. Such "stale" pages do not present any significant obstacle to system behavior, however, as all changes eventually propagate to the backend 190 and up-to-date versions of pages can be easily constructed by applying changes from the active tablets.

Storing the TGID of the frozen set of tablets with the page 142$p$ enables the storage system to determine, based on TGID, which metadata changes 144 in the tablets 150 have been applied and which have not, such that up-to-date versions of the pages 142$p$ can readily be constructed without risking that any metadata changes 144 are applied more than once. For example, if the cache 140 receives a read request 102 for a page 142$p$, the storage system can construct an up-to-date version of the page by reading the page 142$p$ from backend storage 190, checking the TGID-F stored in connection with the page, and then applying any metadata changes 144 found in sets of tablets 150 (active and/or frozen) that have TGIDs greater than the TGID-F associated with the page. Given that it is known that the page 142$p$ contains all changes 144 from tablet sets 150 having TGIDs less than or equal to TGID-F, only changes found in tablet sets having TGIDs greater than TGID-F should be applied.

In accordance with further improvements, the read-modify-write operation 162 is performed under a read lock 180. Unlike the previously-used write lock, which was exclusive and blocked concurrent reads, the read lock 180 is non-exclusive and allows concurrent reads. Thus, for example, a read request 102 for a page 142$p$ can arrive while the read lock 180 is being held on that same page by the read-modify-write operation 162, and the read request 102 can proceed without having to wait for the read lock 180 to be released. In addition, the destage manager 160 can also write 168 to the page 142$p$ under the read lock 180, provided that conflicts are avoided with other writers (if there are any) by other means. For example, it may be required that another writer obtain a write lock for accessing the page 142$p$, which write lock would be granted only after the read lock 180 was released. Thus, conflicts are avoided and a read 102 can coincide with the read-modify-write operation 162 without contention. Such avoidance of contention allows reads 102 to be processed much quicker than in the previous scheme, avoiding long and variable delays. Although the read lock 180 is shown as encompassing both the read 164 and the write 168, one should appreciate that separate read locks may be obtained instead for the read 164 and for the write 168.

The use of TGIDs ensures that a proper, up-to-date version of the page 142*p* can be constructed regardless of whether the read 102 or the write 168 happens first. For example, if the read 102 happens before the write 168 and the TGID-F associated with the page 142*p* is "X," then an up-to-date version of the page can be constructed by applying changes only from tablets having TGIDs greater than X. But if the write 168 happens first, then the TGID-F associated with the page is "X+1," so the up-to-date version is constructed by applying changes only from tablets having TGIDs greater than X+1. The same results are thus obtained regardless of whether the read 102 happens first or the write 168 happens first. All metadata changes 144 are accounted for, and no metadata changes are applied more than once.

Figure 2:
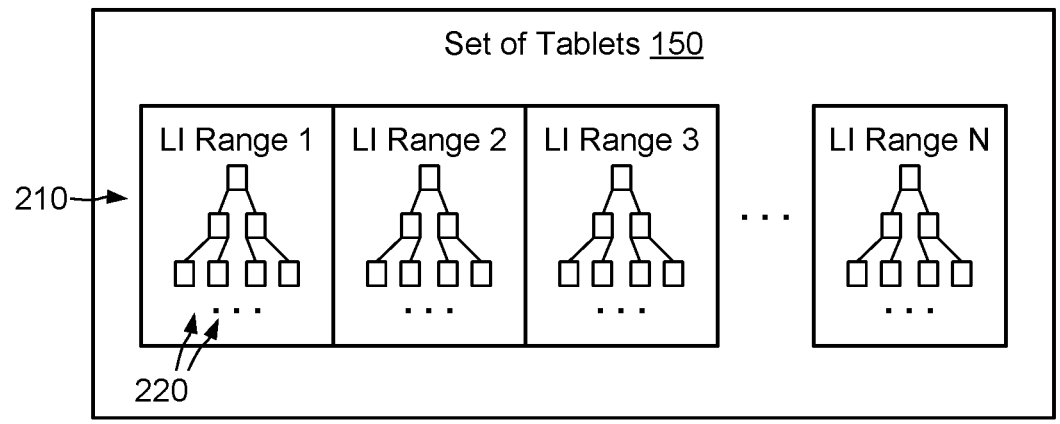
FIG. 2 is a block diagram of an example set of tablets of FIG. 1.

FIG. 2 shows an example set of tablets 150, which is intended to be representative of both the set of active tablets 150-1 and the set of frozen tablets 150-2 of FIG. 1. Here, the set of tablets 150 includes "N" individual tablets 210. Each of the individual tablets 210 covers a respective range of hashed LI values. For example, a first tablet 210 covers a first range of hashed LI values, a second tablet 210 covers a second range of hashed LI values, and so on. In an example, each tablet 210 contains a tree of nodes 220, where each node 220 in the tree corresponds to a particular LI (page). Although not shown in FIG. 2, each node 220 of the tree may be associated with a linked list of metadata changes 144 to be applied to the respective page. In an example, the linked list arranges changes in chronological order.

To add a metadata change 144 to a set of active tablets, the storage system may hash the LI obtained from the associated 4-tuple {LI; EI; T; V} and identify the particular tablet 210 that covers the range of hash values within which the hashed LI falls. The storage system may then look up the node 220 for the specific LI in the tree and append the metadata change 144 to the end of the linked list provided for that node.

To destage metadata changes 144 from a set of frozen tablets, the destage manager 160 may iterate across all nodes 220 in all tablets 210 of that set. For each node 220, the destage manager 160 may read 164 the page corresponding to that node from persistent storage 190, modify 166 the page by merging the metadata changes 144 found in the associated linked list, and write 168 the page back to persistent storage 190. Destaging is complete when all nodes 220 of all tablets 210 of the frozen set have been processed this way.

Figure 3:
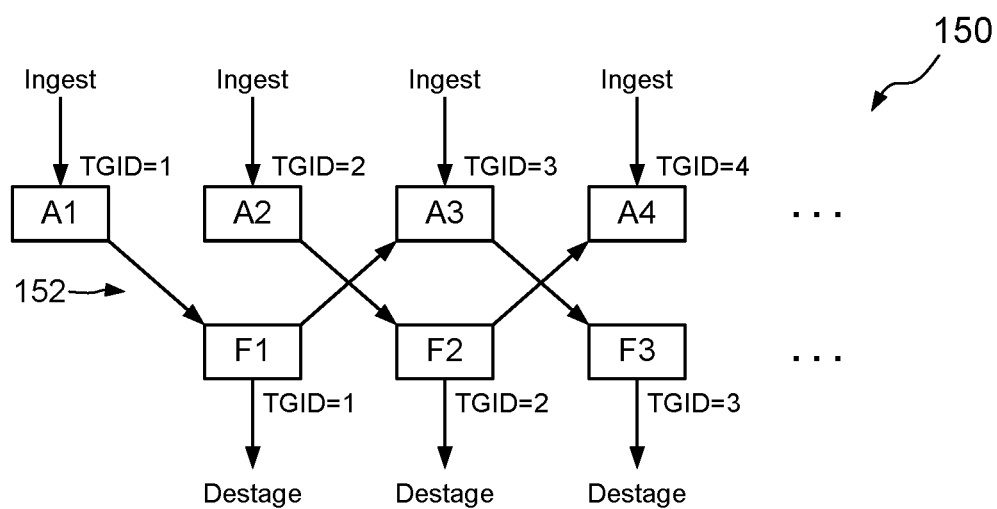
FIG. 3 is a block diagram showing assignments of tablet generation identifiers (TGIDs) to sets of tablets.

FIG. 3 shows an example arrangement for processing sets of tablets 150 with different TGIDs. Proceeding from left to right, an initial set of active tablets (A1) may be assigned a TGID of 1. No set of frozen tablets may yet exist. The set of active tablets A1 ingests metadata changes 144 and becomes full. A first tablet switch 152 then occurs, changing the set of active tablets A1 to a set of frozen tablets F1 but keeping the TGID the same, i.e., 1. At the same time, a new set of active tablets A2 is created and assigned a TGID of 2. Destaging the proceeds from tablets F1, with all pages written as a result of that destaging assigned a TGID of 1.

As A2 becomes full, a second tablet switch 152 occurs, which changes active tablets A2 to frozen tablets F2 but leaves the TGID as 2. At the same time, the previously frozen tablets F1 are freed and become a new set of active tablets A3, with a newly assigned TGID of 3. Destaging then proceeds from tablets F2, with all pages written as a result of that destaging assigned a TGID of 2.

As A3 becomes full, a third tablet switch 152 occurs, which changes active tablets A3 to frozen tablets F3 but leaves the TGID as 3. At the same time, the previously frozen tablets F2 are freed and become a new set of active tablets A4, with a newly assigned TGID of 4. Destaging then proceeds from tablets F3, with all pages written as a result of that destaging assigned a TGID of 3. Processing continues in this manner indefinitely, with a new TGID assigned to each newly provided set of active tablets.

Figure 4:
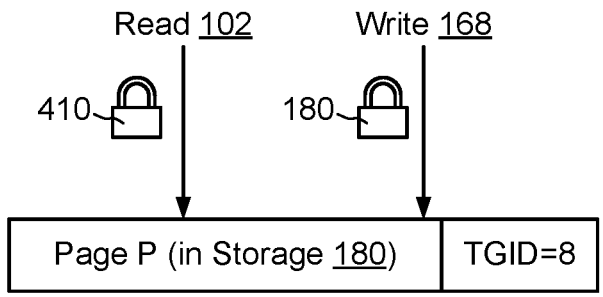
FIG. 4 is a block diagram showing example scenarios that can accompany a read and a write that can occur in any order, or simultaneously.

FIG. 4 shows an example arrangement for managing reads 102 and writes 168, which may occur in any order or simultaneously. Here, we assume that a read 102 is directed to a particular page P, which is associated with an initial TGID of 8. For example, page P may be absent from cache 140, necessitating a read of backend storage 190. Thus, the read 102 may be part of so-called "read-miss" processing, but it may occur in other contexts, as well. The write 168 is assumed to be part of a read-modify-write operation 162 performed by the destaging manager 160 under the read lock 180, i.e., as part of destaging metadata changes 144 to persistent storage 190.

To respond to the read 102, the storage system may acquire a read lock 410, i.e., a "second" read lock, which may be separate from the read lock 180. As both read locks 180 and 410 are non-exclusive, neither prevents the other from reading. Also, the read lock 410 does not prevent the holder of the read lock 180 (i.e., the destage manager 160) from writing.

The content returned in response to the read 102 is the same regardless of whether the read 102 happens first or the write 168 happens first. If the read 102 happens first, then the TGID of the page P will be 8, and the read logic will construct an up-to-date version of the page P by applying metadata changes 144 found in any set or sets of tablets 150 having TGID greater than 8. But if the write 168 happens first, then the TGID of the page P will be 9 (or another number greater than 8), reflecting the new destaging write. The read logic will then construct an up-to-date version of the page P by applying metadata changes 144 found in any set or sets of tablets 150 having TGID greater than 9. In both cases, metadata changes 144 from tablets with TGID greater than 8 are included in the constructed page P, and no metadata changes 144 are repeated. Thus, results are the same regardless of which comes first, the read 102 or the write 168.

In some circumstances, a simultaneous arrival of the read 102 and the write 168 may cause an error. For example, some SSDs do no support page-size write atomicity may write to different parts of the page P at different times. If a read 102 arrives during the middle of a multi-part write to the SSD, erroneous data may be read. To guard against this possibility, which may be exceedingly rare, the read operation 102 may perform checksum validation on the contents that it reads from the page P. For example, the page P may contain a checksum of its contents in a header or footer of the page. The read operation 102 may newly compute the checksum of the contents read from the SSD and compare the computed checksum with the one stored with the page. If the two checksums do not match, the storage system may simply retry the read operation 102, under the assumption that any incomplete write will be completed by the time the read 102 is repeated. Once the checksum is validated upon a second (or other subsequent) read request, the system may proceed to construct the up-to-date version of the page as previously described.

Figure 5:
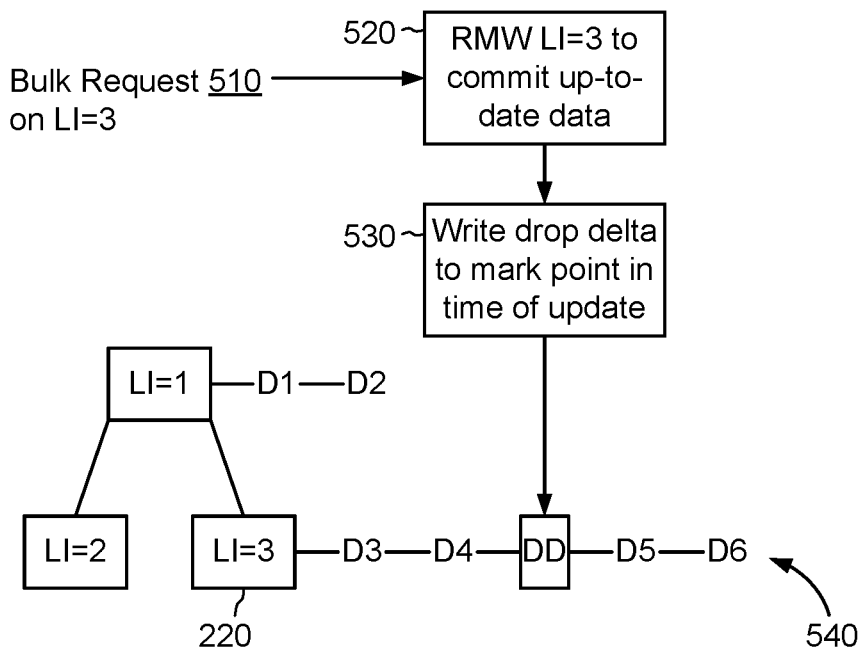
FIG. 5 is a diagram showing an example way of managing bulk commits in the environment of FIG. 1.

FIG. 5 shows an example arrangement for supporting writing to a page 142*p* using a process referred to herein as a "bulk commit." Bulk commits fall outside normal destage processing and may be performed asynchronously with destaging. For example, a client (e.g., a process running within the data storage system 116) may request that a page 142$p$ be written quickly. As another example, a system bottleneck may cause normal destaging to be paused, such that it is necessary to write new metadata changes directly, without going through the sets of tablets 150.

As bulk commits may be requested at any time relative to tablet switches 152 and destaging, special treatment is needed to ensure that any metadata changes 144 written pursuant to bulk commits are not repeated when destaging next occurs. An example of this treatment is shown in the figure.

Here, a request 510 for a bulk commit (i.e., a "bulk request") is received, which specifies a write of a page 142$p$ designated by LI=3. At 520, the storage system performs a read-modify-write operation on the designated page. This operation includes reading the page from backend storage, updating the page with any metadata changes 144 specified for that page in tablet sets 150 (both active and frozen), and writing the page back to persistent storage 150. This read-modify-write differs from the operation 162 described in connection with FIG. 1, as it includes all metadata changes 144, not only those found in frozen tablets. Such writing may be performed under a write lock.

At 530, the storage system writes a "drop delta" DD as a metadata change 144 to the active tablet that contains a node 220 for the designated page, i.e., the one with LI=3. The drop delta DD is added to a linked list 540, which provides a chronological listing of metadata changes 144 accumulated for the page. In the example, it is seen that changes D3 and D4 precede DD in time. Given that the bulk commit commits all metadata changes 144 that preceded it in time, D3 and D4 have already been committed for writing, and these changes must not be repeated during subsequent destaging. The drop delta DD thus marks the point in time before which changes should not be destaged.

It can further be seen that additional metadata changes D5 and D6 arrive after the drop delta DD. These changes were not committed by the bulk commit and thus are still available for destaging later. When the next destaging event happens (after the active tablets are frozen), and assuming no additional drop deltas arrive for LI=3, the destage manager 160 applies D5 and D6 (It also applies D1 and D2 for LI=1). But owing to the drop delta DD, the destage manager 160 ignores any changes that come before the drop delta, i.e., D3 and D4. Thus, repeated writing of D3 and D4 is avoided. Using drop deltas, bulk commits can be interspersed seamlessly with destaging based on TGIDs without repeatedly applying any metadata changes, thus avoiding corruption when processing changes that are not idempotent.

Figure 6:
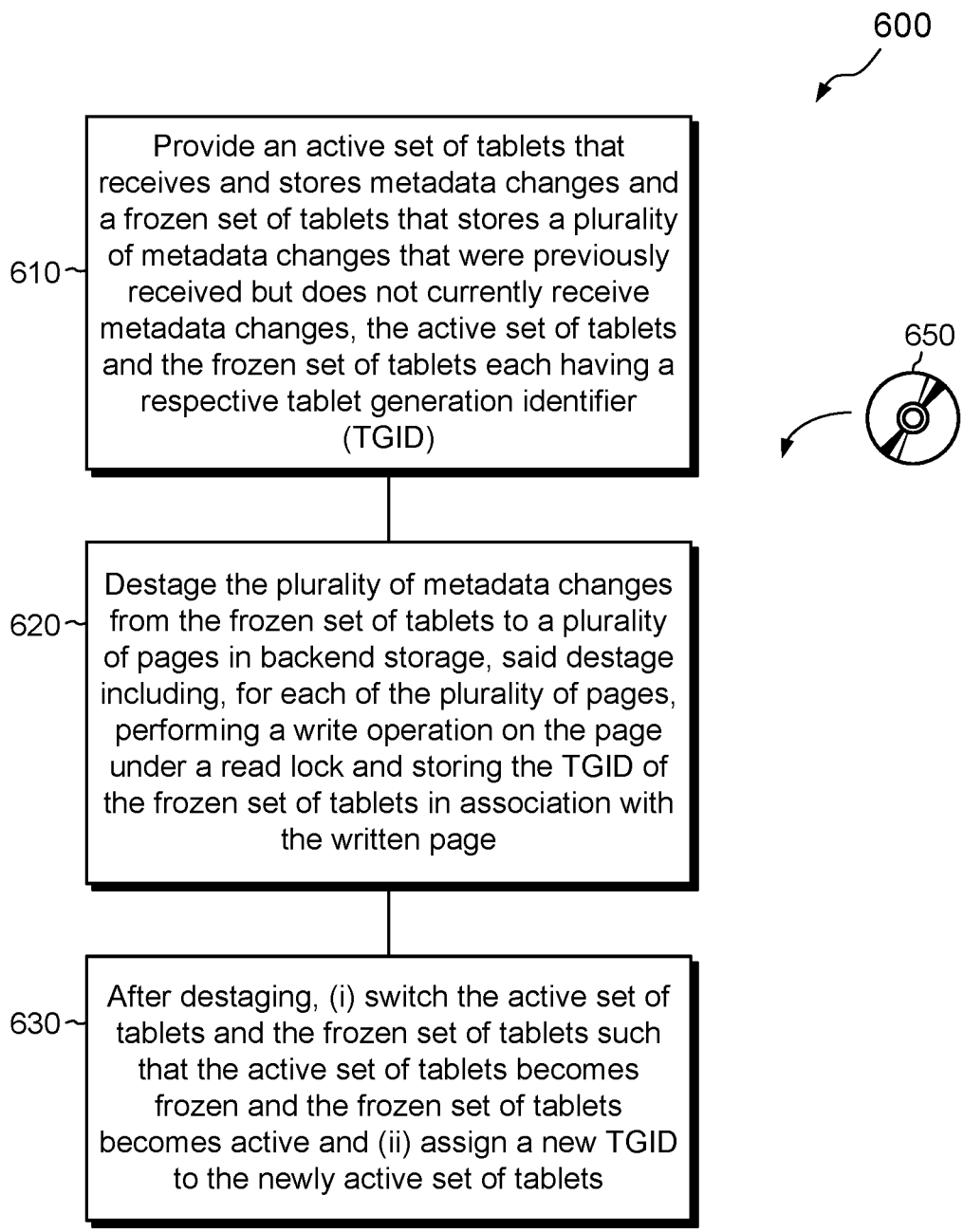
FIG. 6 is a flowchart showing an example method of managing metadata.

FIG. 6 shows an example method 600 that may be carried out in connection with the environment 100 and provides an overview of some of the activities described above. The method 600 is typically performed, for example, by the software constructs described in connection with FIG. 1, which reside in the memory 130 of a node 120 and are run by the set of processors 124. The various acts of method 600 may be ordered in any suitable way. Accordingly, embodiments may be constructed in which acts are performed in orders different from that illustrated, which may include performing some acts simultaneously.

At 610, an active set of tablets 150-1 is provided that receives and stores metadata changes 144 and a frozen set of tablets 150-2 is provided that stores a plurality of metadata changes 144 that were received previously but does not currently receive metadata changes 144. The active set of tablets 150-1 and the frozen set of tablets 150-2 each have a respective tablet generation identifier (TGID), such as TGID-1 and TGID-2.

At 620, the plurality of metadata changes 144 are destaged from the frozen set of tablets 150-2 to a plurality of pages 142$p$ in backend storage 190. The destaging includes, for each of the plurality of pages 142$p$, performing a write operation 168 on the page under a read lock 180 and storing the TGID (TGID-F) of the frozen set of tablets 150-2 in association with the written page, such as in a header of footer of the page.

At 630, after destaging, (i) the active set of tablets 150-1 and the frozen set of tablets 150-2 are switched 152 such that the active set of tablets becomes frozen and the frozen set of tablets becomes active and (ii) a new TGID is assigned to the newly active set of tablets.

An improved technique has been described of managing metadata. The technique includes receiving metadata changes 144 into active tablets. When the active tablets are filled, the active tablets are changed to frozen tablets, whereupon previously frozen tablets are freed and changed to active tablets. The technique further includes destaging metadata changes 144 from the frozen tablets to pages 142$p$ in backend storage 190 under read locks 180. Tablet generation identifiers (TGIDs) are assigned to successive generations of tablets 150, and a TGID (TGID-F) of the frozen tablets is stored with the pages that are written as part of destaging from the frozen tablets.

Having described certain embodiments, numerous alternative embodiments or variations can be made. Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing metadata, comprising:
providing, in volatile memory of a storage system, an active set of tablets that receives and stores metadata changes and a frozen set of tablets that stores a plurality of metadata changes that were previously received but does not currently receive metadata changes, the active set of tablets and the frozen set of tablets each having a respective tablet generation identifier (TGID);
destaging the plurality of metadata changes from the frozen set of tablets in the volatile memory to a plurality of pages in persistent backend storage, said destaging including, for each of the plurality of pages, performing a write operation on the page under a read lock and storing the TGID of the frozen set of tablets in association with the written page; and
after destaging, (i) switching the active set of tablets and the frozen set of tablets such that the active set of tablets becomes frozen and the frozen set of tablets becomes active and (ii) assigning a new TGID to the newly active set of tablets,
wherein the method further comprises:
receiving a read request to read a target page of the plurality of pages; and
in response to receiving the read request, (i) acquiring a second read lock on the target page, (ii) reading the target page from backend storage under the second read lock, including obtaining the TGID associated with the target page, and (iii) modifying the target page to include metadata changes only from sets of tablets having TGID assigned after the TGID associated with the target page.

2. The method of claim 1, further comprising assigning TGIDs as monotonically changing numbers, wherein a new TGID is assigned each time a frozen set of tablets becomes active.

3. The method of claim 2, wherein storing the TGID of the frozen set of tablets in association with the written page includes storing the TGID in at least one of a header or a footer of the written page.

4. The method of claim 2, wherein the read lock and the second read lock are held concurrently, such that reading the target page in response to the read request can occur before, after, or concurrently with writing the same page during the write operation.

5. The method of claim 4, wherein reading the target page in response to the read request occurs before writing the target page during the write operation, wherein the TGID obtained when reading the target page in response to the read request has a value X, and wherein modifying the target page in response to the read request includes applying metadata changes from only sets of tablets having TGID greater than X.

6. The method of claim 4, wherein reading the target page in response to the read request occurs after writing the target page during the write operation, wherein the TGID associated with the target page increases from X to X+1 as a result of writing the target page, and wherein modifying the target page in response to the read request includes applying metadata changes from only tablets that have TGID greater than X+1.

7. The method of claim 4, wherein reading the target page in response to the read request occurs simultaneously with writing the target page during the write operation, and wherein the method further comprises:
performing a checksum validation on the target page read in response to the read request; and
retrying the read request in response to the checksum validation failing.

8. The method of claim 2, further comprising:
receiving a bulk request to write to a particular page to backend storage apart from the destaging;
in response to receiving the bulk request,
(i) reading the particular page from backend storage,
(ii) updating the particular page with metadata changes from both the set of active tablets and the set of frozen tablets,
(iii) inserting a drop delta into the active set of tablets in connection with the particular page, the drop delta marking a point in time when the updated particular page is committed for writing to backend storage; and
(iv) writing the updated particular page back to backend storage.

9. The method of claim 8, wherein writing the updated particular page back to the backend storage is performed without updating the TGID associated with the particular page.

10. The method of claim 9 wherein, during a subsequent act of destaging, the method further comprises updating the particular page based on metadata changes found only from tablets having TGID greater than the TGID associated with the particular page and occurring after the drop delta in time.

11. A computerized apparatus, comprising control circuitry that includes a set of processors coupled to memory, the control circuitry constructed and arranged to:
provide an active set of tablets that receives and stores metadata changes and a frozen set of tablets that stores a plurality of metadata changes that were previously received but does not currently receive metadata changes, the active set of tablets and the frozen set of tablets each having a respective tablet generation identifier (TGID);
destage the plurality of metadata changes from the frozen set of tablets to a plurality of pages in backend storage, said destaging including, for each of the plurality of pages, performing a write operation on the page under a read lock and storing the TGID of the frozen set of tablets in association with the written page; and after destaging, (i) switch the active set of tablets and the frozen set of tablets such that the active set of tablets becomes frozen and the frozen set of tablets becomes active and (ii) assign a new TGID to the newly active set of tablets, wherein the control circuitry is further constructed and arranged to:

receive a read request to read a target page of the plurality of pages; and in response to receipt of the read request, (i) acquire a second read lock on the target page, (ii) read the target page from backend storage under the second read lock, including obtaining the TGID associated with the target page, and (iii) modify the target page to include metadata changes only from sets of tablets having TGID assigned after the TGID associated with the target page.

12. A computer program product including a set of non-transitory, computer-readable media having instructions which, when executed by control circuitry of a computerized apparatus, cause the computerized apparatus to perform a method of managing metadata, the method comprising:

providing an active set of tablets that receives and stores metadata changes and a frozen set of tablets that stores a plurality of metadata changes that were previously received but does not currently receive metadata changes, the active set of tablets and the frozen set of tablets each having a respective tablet generation identifier (TGID);

destaging the plurality of metadata changes from the frozen set of tablets to a plurality of pages in backend storage, said destaging including, for each of the plurality of pages, performing a write operation on the page under a read lock and storing the TGID of the frozen set of tablets in association with the written page; and after destaging, (i) switching the active set of tablets and the frozen set of tablets such that the active set of tablets becomes frozen and the frozen set of tablets becomes active and (ii) assigning a new TGID to the newly active set of tablets, wherein the method further comprises:

receiving a read request to read a target page of the plurality of pages; and in response to receiving the read request, (i) acquiring a second read lock on the target page, (ii) reading the target page from backend storage under the second read lock, including obtaining the TGID associated with the target page, and (iii) modifying the target page to include metadata changes only from sets of tablets having TGID assigned after the TGID associated with the target page.

13. The computer program product of claim 12, wherein the method further comprises assigning TGIDs as monotonically changing numbers, wherein a new TGID is assigned each time a frozen set of tablets becomes active.

14. The computer program product of claim 13, wherein storing the TGID of the frozen set of tablets in association with the written page includes storing the TGID in at least one of a header or a footer of the written page.

15. The computer program product of claim 13, wherein the read lock and the second read lock are held concurrently, such that reading the target page in response to the read request can occur before, after, or concurrently with writing the same page during the write operation.

16. The computer program product of claim 15, wherein reading the target page in response to the read request occurs before writing the target page during the write operation, wherein the TGID obtained when reading the target page in response to the read request has a value X, and wherein modifying the target page in response to the read request includes applying metadata changes from only sets of tablets having TGID greater than X.

17. The computer program product of claim 15, wherein reading the target page in response to the read request occurs after writing the target page during the write operation, wherein the TGID associated with the target page increases from X to X+1 as a result of writing the target page, and wherein modifying the target page in response to the read request includes applying metadata changes from only tablets that have TGID greater than X+1.

18. The computer program product of claim 15, wherein reading the target page in response to the read request occurs simultaneously with writing the target page during the write operation, and wherein the method further comprises:

performing a checksum validation on the target page read in response to the read request; and retrying the read request in response to the checksum validation failing.

19. The computer program product of claim 13, wherein the method comprises:

receiving a bulk request to write to a particular page to backend storage apart from the destaging;

in response to receiving the bulk request,
(i) reading the particular page from backend storage,
(ii) updating the particular page with metadata changes from both the set of active tablets and the set of frozen tablets,
(iii) inserting a drop delta into the active set of tablets in connection with the particular page, the drop delta marking a point in time when the updated particular page is committed for writing to backend storage; and
(iv) writing the updated particular page back to backend storage.

20. The computer program product of claim 19, wherein writing the updated particular page back to the backend storage is performed without updating the TGID associated with the particular page.

* * * * *